(12) United States Patent
Myers et al.

(10) Patent No.: US 11,040,771 B2
(45) Date of Patent: Jun. 22, 2021

(54) ROTOR HUB

(71) Applicant: AVX Aircraft Company, Benbrook, TX (US)

(72) Inventors: Alan W. Myers, Granbury, TX (US); John D. Busch, Grand Prairie, TX (US)

(73) Assignee: AVX AIRCRAFT COMPANY, Benbrook, TX (US)

( * ) Notice: Subject to any disclaimer, the term of this patent is extended or adjusted under 35 U.S.C. 154(b) by 55 days.

(21) Appl. No.: 16/406,508

(22) Filed: May 8, 2019

(65) Prior Publication Data
US 2019/0344884 A1   Nov. 14, 2019

Related U.S. Application Data

(60) Provisional application No. 62/668,676, filed on May 8, 2018.

(51) Int. Cl.
| | | |
|---|---|---|
| *B64C 27/39* | (2006.01) | |
| *B64C 27/48* | (2006.01) | |
| *B64C 27/35* | (2006.01) | |
| *B64C 27/51* | (2006.01) | |
| *B64C 27/50* | (2006.01) | |

(52) U.S. Cl.
CPC ............. *B64C 27/39* (2013.01); *B64C 27/35* (2013.01); *B64C 27/48* (2013.01); *B64C 27/51* (2013.01); *B64C 27/50* (2013.01)

(58) Field of Classification Search
CPC ......... B64C 27/39; B64C 27/35; B64C 27/51; B64C 27/605; B64C 27/635; B64C 27/54; B64C 27/59
See application file for complete search history.

(56) References Cited

U.S. PATENT DOCUMENTS

| | | | | | |
|---|---|---|---|---|---|
| 2,494,985 | A | * | 1/1950 | Campbell | ............... B64C 27/51 416/106 |
| 2,568,214 | A | * | 9/1951 | Bennett | ................... B64C 27/51 416/52 |
| 2,604,953 | A | * | 7/1952 | Campbell | ............... B64C 27/51 416/119 |
| 2,616,510 | A | * | 11/1952 | Rzeczycki | .............. B64C 27/51 416/100 |
| 2,640,553 | A | * | 6/1953 | Hafner | .................... B64C 27/51 416/106 |

(Continued)

FOREIGN PATENT DOCUMENTS

| | | | | | |
|---|---|---|---|---|---|
| CA | 2520778 | A1 | * | 3/2006 | ............. B64C 27/35 |
| CA | 2822073 | A1 | * | 2/2014 | ........... B64C 27/605 |

(Continued)

OTHER PUBLICATIONS

International Preliminary Report on Patentability for International Application No. PCT/US20191031284; dated Feb. 17, 2021; 10 pages.

(Continued)

*Primary Examiner* — Ninh H. Nguyen
*Assistant Examiner* — Brian Christopher Delrue
(74) *Attorney, Agent, or Firm* — Perkins Coie LLP

(57) ABSTRACT

A rotor hub is presented that uses a low profile and frontal area design that reduces drag and combines the advantages of utilizing a virtual flapping hinge and a soft in-plane rotor hub.

15 Claims, 6 Drawing Sheets

(56) References Cited

U.S. PATENT DOCUMENTS

| | | | | |
|---|---|---|---|---|
| 2,640,554 A * | 6/1953 | Campbell | B64C 27/54 | 416/106 |
| 3,310,119 A * | 3/1967 | Watson | B64C 27/37 | 416/159 |
| 3,361,216 A * | 1/1968 | Walker | B64C 11/008 | 416/26 |
| 3,484,173 A * | 12/1969 | Rybicki | B64C 27/51 | 416/106 |
| 3,762,834 A * | 10/1973 | Bourquardez | B64C 27/33 | 416/134 R |
| 3,807,897 A * | 4/1974 | Lucien | B64C 27/33 | 416/140 |
| 4,105,365 A * | 8/1978 | Ferris | B64C 27/51 | 416/107 |
| 4,307,996 A * | 12/1981 | Watson | B64C 27/33 | 416/138 |
| 4,342,540 A * | 8/1982 | Lovera | B64C 27/35 | 416/107 |
| 4,381,902 A * | 5/1983 | Head | B64C 27/33 | 416/134 A |
| 4,568,245 A * | 2/1986 | Hibyan | B64C 27/32 | 416/134 A |
| 4,650,401 A * | 3/1987 | Yao | B64C 27/33 | 416/134 A |
| 4,795,310 A * | 1/1989 | McArdle | B29C 70/347 | 416/134 A |
| 4,915,585 A * | 4/1990 | Guimbal | B64C 27/51 | 416/107 |
| 5,219,430 A * | 6/1993 | Antoine | B64C 27/51 | 188/282.1 |
| 5,769,606 A * | 6/1998 | Mondet | B64D 15/12 | 244/134 D |
| 6,036,442 A * | 3/2000 | Certain | B64C 27/50 | 416/143 |
| 6,092,795 A * | 7/2000 | McGuire | F16F 13/24 | 188/322.21 |
| 6,140,720 A * | 10/2000 | Certain | B64C 27/35 | 310/43 |
| 6,200,097 B1 * | 3/2001 | Mouille | B64C 27/32 | 416/107 |
| 6,296,444 B1 * | 10/2001 | Schellhase | B64C 27/32 | 416/134 A |
| 6,447,249 B2 * | 9/2002 | Potdevin | B64C 27/50 | 416/143 |
| 6,910,865 B2 * | 6/2005 | Pancotti | B64C 27/32 | 416/134 A |
| 7,275,913 B2 * | 10/2007 | Becker | B64C 27/32 | 416/134 A |
| 8,167,561 B2 * | 5/2012 | Jones | F16F 15/08 | 416/140 |
| 8,336,815 B2 * | 12/2012 | Rauber | F16C 1/04 | 244/60 |
| 8,496,435 B2 * | 7/2013 | Nannoni | B64C 27/35 | 416/140 |
| 8,632,308 B2 * | 1/2014 | Russell | B64C 27/51 | 416/145 |
| 8,695,917 B2 * | 4/2014 | Cranga | B64C 27/001 | 244/17.11 |
| 8,801,378 B2 * | 8/2014 | Baskin | B64C 11/06 | 416/104 |
| 8,985,951 B2 * | 3/2015 | Rauber | B64C 27/43 | 416/141 |
| 9,169,010 B2 * | 10/2015 | Foskey | B64C 27/35 | |
| 9,193,454 B2 * | 11/2015 | Modrzejewski | B64C 27/605 | |
| 9,284,051 B2 * | 3/2016 | Amari | B64C 27/635 | |
| 9,457,898 B2 * | 10/2016 | Russell | F16K 15/00 | |
| 9,499,262 B2 * | 11/2016 | Foskey | B64C 27/48 | |
| 9,505,490 B2 * | 11/2016 | Maresh | B64C 11/02 | |
| 9,637,228 B2 * | 5/2017 | Mazet | B64C 27/51 | |
| 9,701,403 B2 * | 7/2017 | Kizhakkepat | B29C 70/202 | |
| 9,765,825 B2 * | 9/2017 | Stamps | B64C 27/39 | |
| 9,879,753 B2 * | 1/2018 | McGill | B64C 27/635 | |
| 9,994,311 B2 * | 6/2018 | Rauber | B64C 27/41 | |
| 10,086,934 B2 * | 10/2018 | Maresh | B64C 27/35 | |
| 10,232,932 B2 * | 3/2019 | Baldwin | B64C 29/0033 | |
| 10,309,452 B2 * | 6/2019 | Mueller | F16F 1/393 | |
| 10,569,867 B2 * | 2/2020 | Maresh | B64C 27/33 | |
| 10,569,869 B2 * | 2/2020 | Paulson | B64C 3/56 | |
| 10,577,079 B2 * | 3/2020 | Paulson | B64C 11/28 | |
| 10,640,205 B2 * | 5/2020 | Paulson | B64C 27/50 | |
| 10,703,460 B2 * | 7/2020 | Paulson | B64C 27/28 | |
| 10,703,461 B2 * | 7/2020 | Cravener | B64C 11/30 | |
| 10,703,469 B2 * | 7/2020 | Paulson | B64C 27/48 | |
| 2003/0146343 A1 * | 8/2003 | Zoppitelli | B64C 27/35 | 244/17.11 |
| 2006/0222505 A1 * | 10/2006 | Sehgal | B64C 27/001 | 416/244 R |
| 2008/0101934 A1 * | 5/2008 | Stamps | B64C 27/33 | 416/134 A |
| 2008/0159862 A1 * | 7/2008 | Beroul | B64C 27/35 | 416/140 |
| 2009/0110555 A1 * | 4/2009 | Jones | B64C 27/51 | 416/140 |
| 2010/0215496 A1 * | 8/2010 | Nannoni | B64C 27/51 | 416/135 |
| 2010/0221119 A1 * | 9/2010 | Baskin | B64C 27/33 | 416/244 R |
| 2011/0243734 A1 * | 10/2011 | Schmaling | B64C 27/35 | 416/107 |
| 2013/0004311 A1 * | 1/2013 | Stamps | B64C 27/35 | 416/1 |
| 2013/0224025 A1 * | 8/2013 | Foskey | B64C 27/35 | 416/148 |
| 2013/0287576 A1 * | 10/2013 | Stamps | B64C 27/48 | 416/174 |
| 2014/0178199 A1 * | 6/2014 | Wiinikka | B64C 27/008 | 416/1 |
| 2014/0271222 A1 * | 9/2014 | Maresh | B64C 27/35 | 416/244 R |
| 2014/0322010 A1 * | 10/2014 | Rauber | B64C 27/41 | 416/1 |
| 2015/0125300 A1 * | 5/2015 | Stamps | B64C 27/35 | 416/134 A |
| 2015/0251753 A1 * | 9/2015 | Jarrett | B64C 27/605 | 416/104 |
| 2017/0073067 A1 * | 3/2017 | Maresh | B64C 27/35 | |
| 2017/0320567 A1 * | 11/2017 | Miller | B64C 27/635 | |
| 2018/0093764 A1 * | 4/2018 | Jarrett | B64C 27/605 | |
| 2018/0162526 A1 * | 6/2018 | Parham, Jr. | B64C 27/54 | |
| 2018/0186447 A1 * | 7/2018 | Miller | B64C 27/33 | |
| 2018/0244377 A1 * | 8/2018 | Chan | B64C 39/024 | |
| 2018/0327086 A1 * | 11/2018 | Burgess | B64C 27/35 | |
| 2018/0327089 A1 * | 11/2018 | Shimek | B32B 5/26 | |
| 2018/0346109 A1 * | 12/2018 | Maresh | B64C 11/12 | |
| 2019/0002085 A1 * | 1/2019 | Choi | B64C 11/32 | |
| 2019/0077502 A1 * | 3/2019 | Owens | F16C 27/00 | |
| 2019/0092460 A1 * | 3/2019 | Marshall | B64C 27/51 | |
| 2019/0100300 A1 * | 4/2019 | Haldeman | B64C 27/72 | |
| 2019/0112041 A1 * | 4/2019 | Haldeman | B64C 27/51 | |
| 2019/0256205 A1 * | 8/2019 | Maresh | B64C 27/35 | |
| 2019/0277343 A1 * | 9/2019 | Baldwin | F16D 3/62 | |
| 2019/0382107 A1 * | 12/2019 | Shimek | B64C 27/605 | |
| 2020/0039633 A1 * | 2/2020 | Cravener | B64C 29/0033 | |
| 2020/0148332 A1 * | 5/2020 | Foskey | B64C 11/32 | |
| 2020/0180757 A1 * | 6/2020 | Poster | B64C 27/605 | |
| 2020/0290729 A1 * | 9/2020 | Charafeddine | B64C 13/50 | |

FOREIGN PATENT DOCUMENTS

| | | | | |
|---|---|---|---|---|
| CA | 2983143 A1 * | 6/2018 | | B64C 27/35 |
| EP | 0742144 A1 * | 11/1996 | | B64C 27/51 |
| EP | 2947007 A1 * | 11/2015 | | F16C 11/0695 |
| EP | 3446973 A1 * | 2/2019 | | B64C 27/605 |
| EP | 3450308 A1 * | 3/2019 | | B64C 27/605 |
| JP | 2004067054 | 3/2004 | | |
| WO | WO-2007064351 A1 * | 6/2007 | | B64C 27/32 |
| WO | WO-2007067260 A2 * | 6/2007 | | B64C 27/605 |
| WO | WO-2007133735 A2 * | 11/2007 | | B64C 27/32 |

(56) References Cited

FOREIGN PATENT DOCUMENTS

OTHER PUBLICATIONS

International Search Report and Written Opinion for International Application No. PCT/US2019/031284; dated Aug. 19, 2019; 12 pages.

* cited by examiner

VIEW A

SECTION A-A

// ROTOR HUB

CROSS-REFERENCE TO RELATED APPLICATIONS

The present application is a non-provisional of U.S. Provisional Patent Application Ser. No. 62/668,676, titled "Rotor Hub", filed May 8, 2018, which is incorporated herein as if set out in full.

BACKGROUND

Helicopter rotor blades are subject to aerodynamic and inertial forces that, in turn, create vibratory (oscillatory) motions because of the non-uniform flow environment in which these aircraft are designed to operate. With reference to FIG. 1, the aerodynamic forces can cause the rotor to cone and flap as it rotates. When the rotor cones, all blades move up or down in unison. When the rotor flaps, opposing blades move in opposite directions. This coning and flapping are accommodated by the rotor hub either by bearings or by deflection of structural members. The radial location of this bearing or flexure is important because it determines the rotor hub moment used to control the helicopter and, therefore, this location is usually a design parameter that must be controlled. The component described as a "Yoke" in the present technology is designed with a flexure that provides this deflection to permit the blade to cone and to flap.

In the case of a flexure type hub, where the flapping "hinge" is due to the structural deflection of the flexure, the term "virtual hinge" is used. Typically, the location of this virtual hinge is specified by the intersection of two lines drawn tangent to the inboard and outboard slope of the deflected yoke. Dynamically, the flap moment at the hub is the same as if there was a pure hinge. The yoke of some embodiments of the present technology is tapered to give the precise moment desired at the hub for a specified amount of blade flapping.

The combination of coning and flapping creates Coriolis forces caused by the blade center-of-gravity moving radially as the rotor flaps. These loads are imposed in the chordwise direction and can be quite large at the root end of the blades and hub. In the design of the present technology these loads are reduced by the lag hinge and damper that tune the first lag mode below the rotor rotational speed (RPM or CPS). This tuning is referred to as "soft-in-plane" and is achieved by the lag hinge and damper incorporated in embodiments of the present technology.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present disclosure provides an advanced technology hub for rotor aircraft.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 1 depicts a schematic, elevation view of a prior art helicopter and demonstrates coning and flapping of the rotor commonly caused by aerodynamic and inertia forces on the helicopter rotor.

FIG. 2 depicts a partial, isometric view of one embodiment of a rotor mast and hub of a soft in-plane rotor of the present technology. Manual blade fold for transportation or storage is illustrated. The cross-section A-A is presented in FIG. 5.

Figure 1:
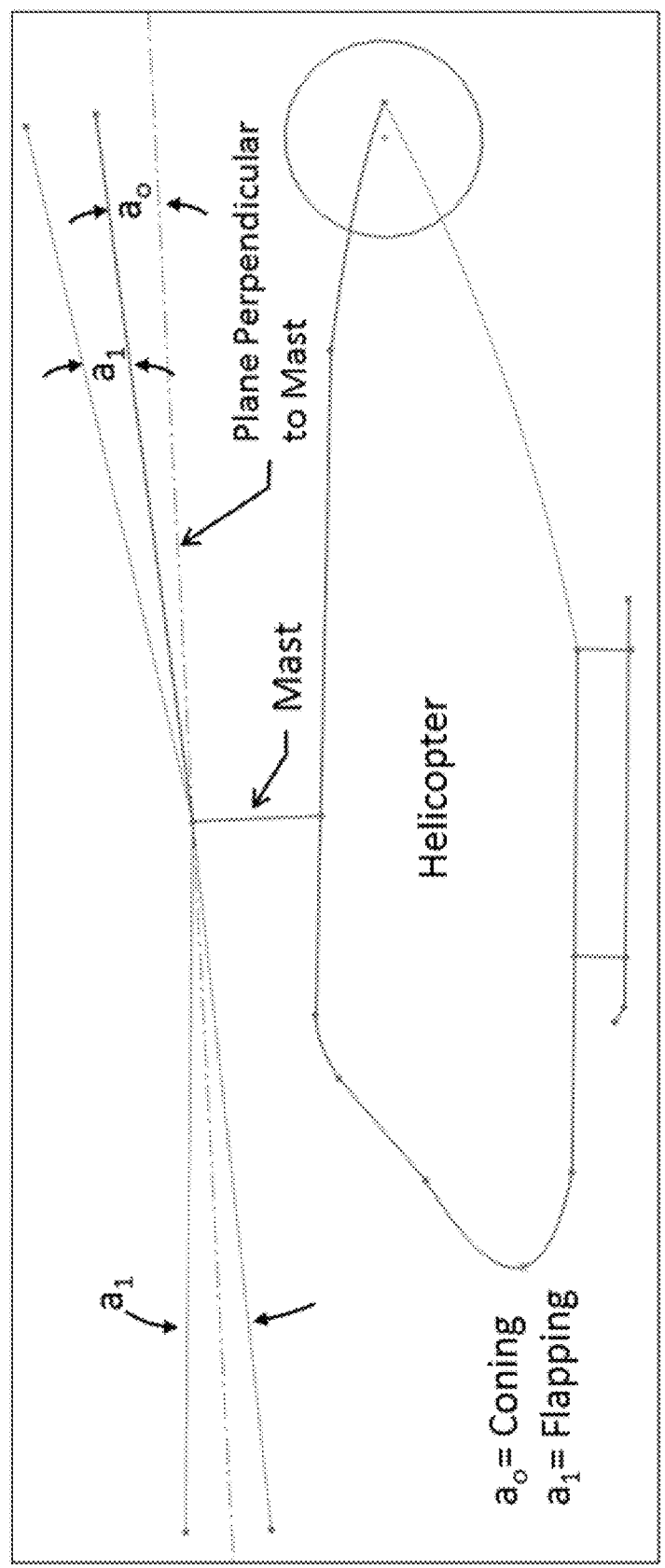
Figure 2:
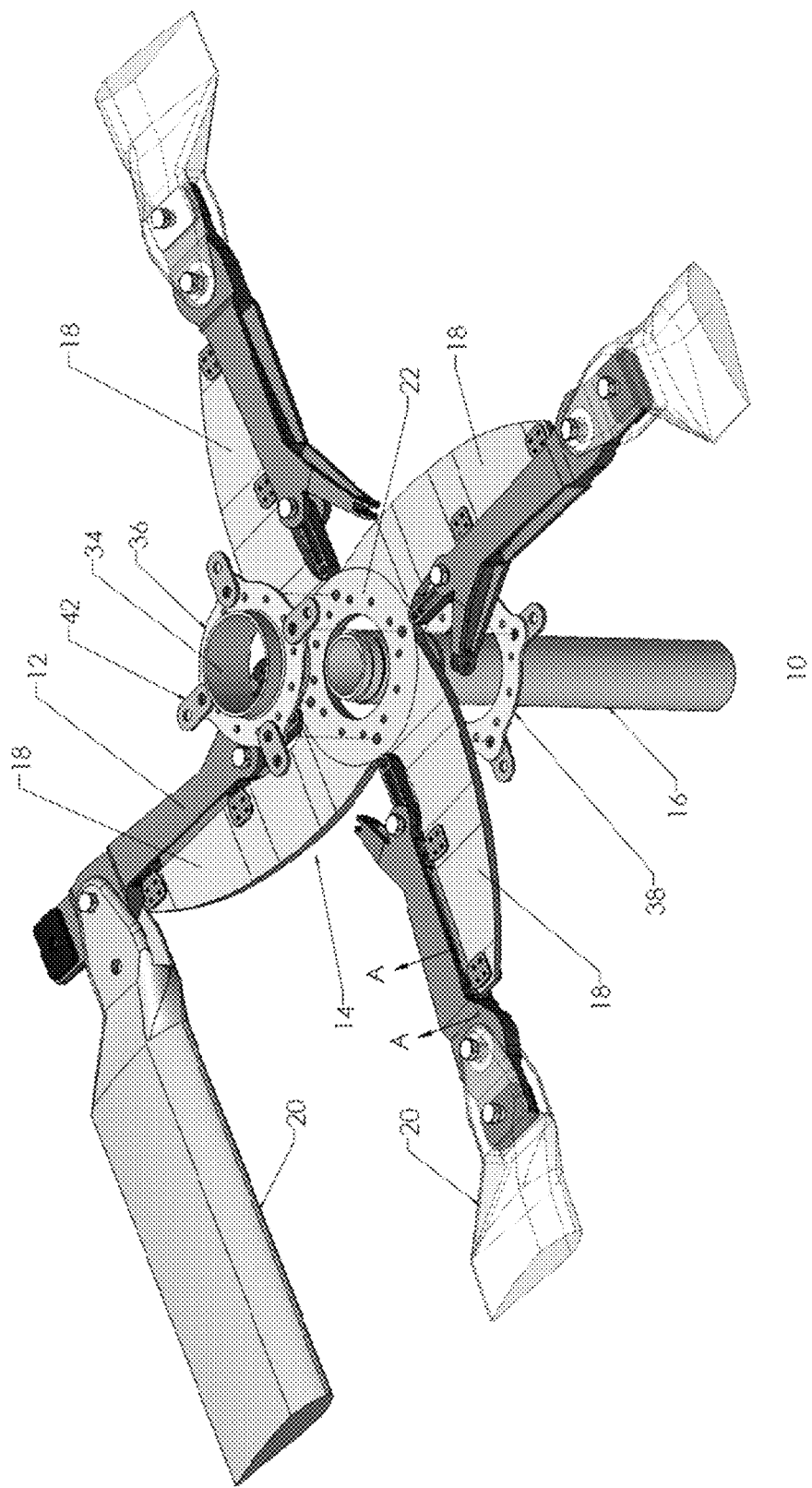
Figure 5:
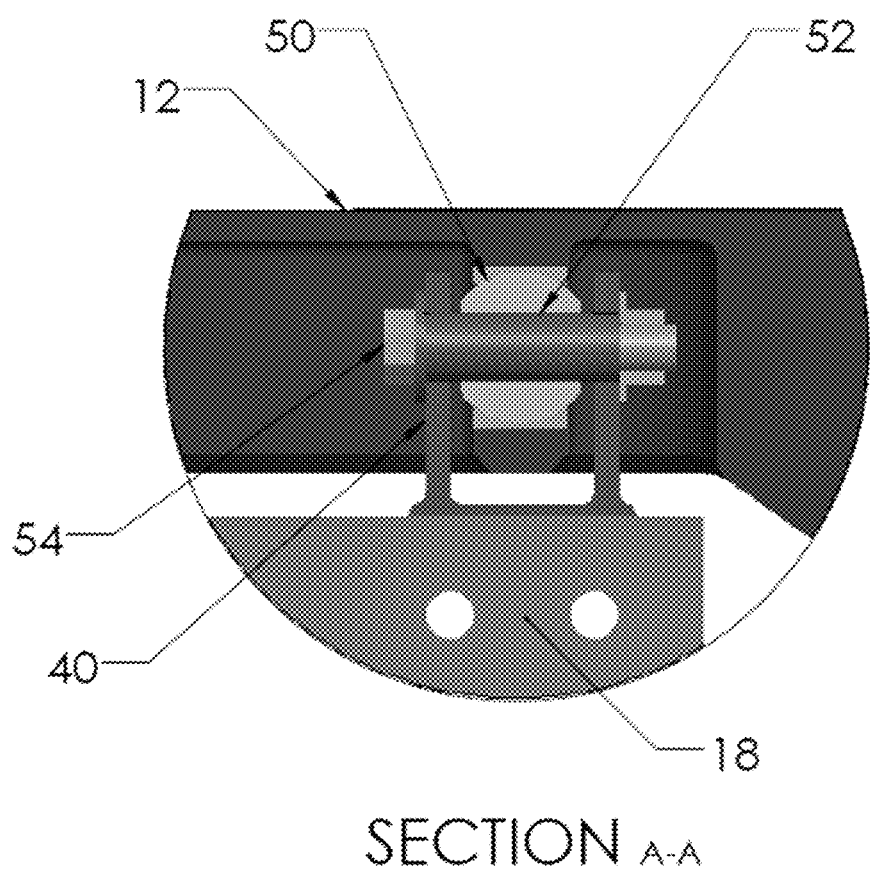

FIG. 5 presents the details of Section A-A referenced in FIG. 2.

Figure 6:
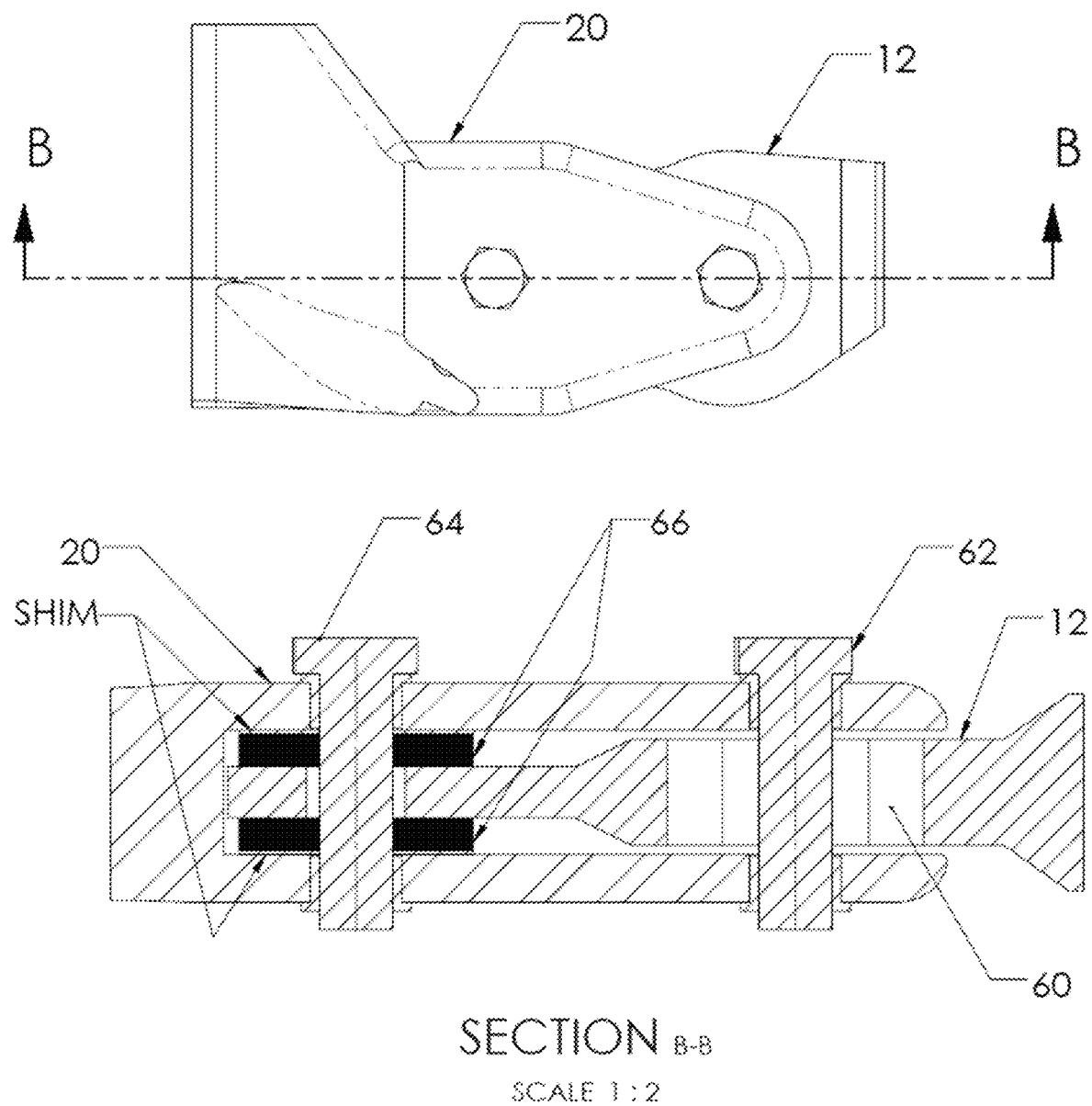

FIG. 6 describes the assembly of the blade to the outboard end of the grip.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

With reference to FIGS. 2-6 a novel rotor hub is presented. Various embodiments of the rotor hub of the present technology may incorporate one or more of the following design characteristics:

1) The yoke may be made of graphite epoxy, which allows embodiments of the rotor hub design to have a tapered thickness and stiffness to achieve a precise location of the virtual flapping hinge.
2) A lag hinge may be incorporated at an outboard end of the grip (inboard end of the blade) that accommodates small lag motion and reduces moments due to blade inertial and aerodynamic forces.
3) A lag spring/damper may be incorporated that is placed along the blade radial axis providing a compact installation that also reduces drag. This arrangement also allows blade folding by disengaging the damper attachment pin and rotating the blade around the lag hinge. This reduces the space required to hanger or store the aircraft.

Figure 3:
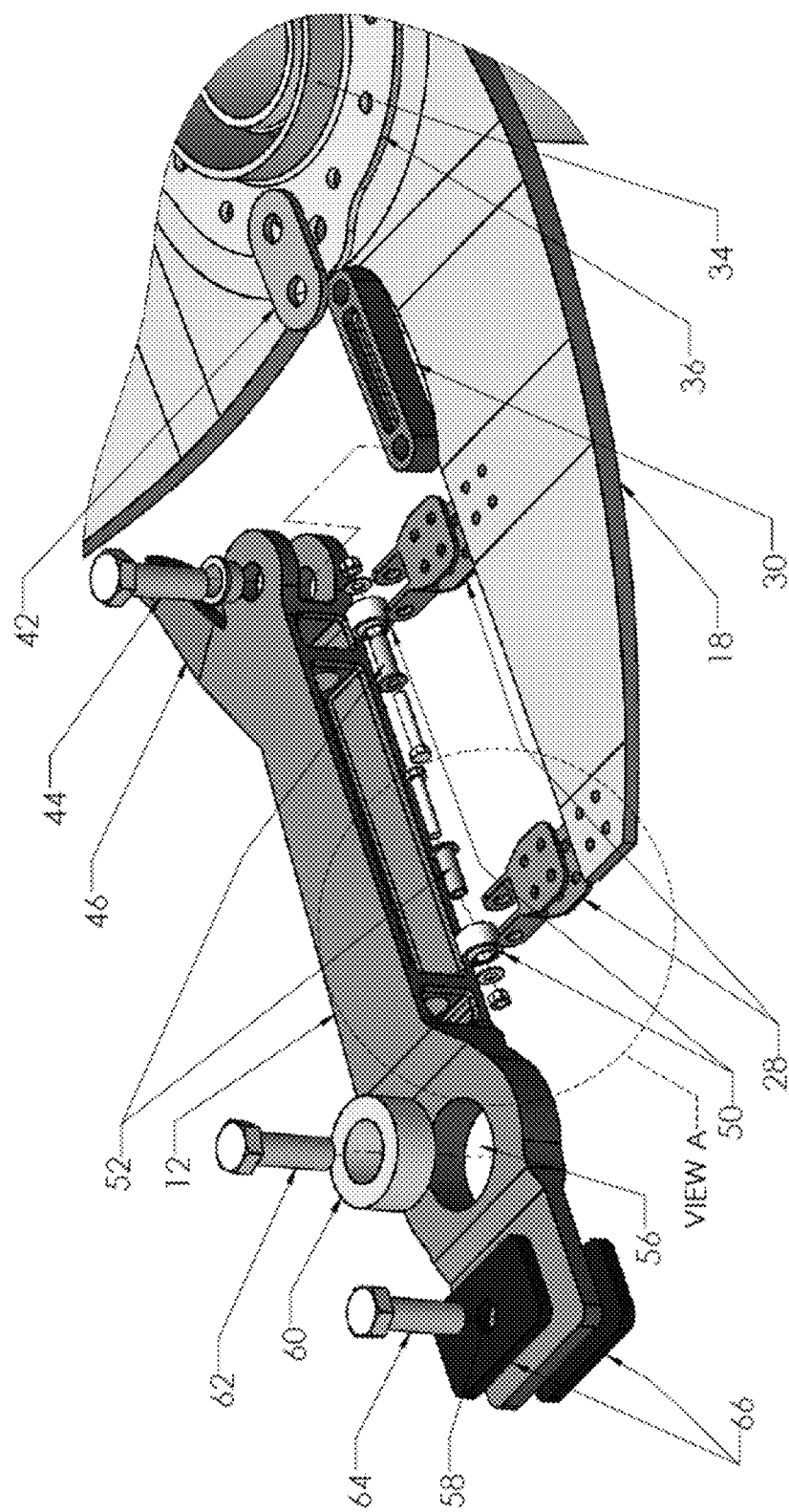
FIG. 3 depicts a partial, exploded view of one embodiment of a rotor hub of the present technology illustrating the assembly of major comments.

With reference to FIGS. 2 and 3, one embodiment of a soft in-plane rotor hub assembly 10 is depicted. In the depicted embodiment, a pair of hub clamp plates attach a yoke 14 to a mast 16 and is at least partially responsible for transmitting torque. A yoke arm 18 accommodates flapping and coning and reacts blade beam and chord shears. The yoke arm 18 does not, however, react centrifugal force. Grip 12 transmits centrifugal force from a blade 20 to a yoke center section 22 and beam and chord shears to the yoke 14. This accommodates blade attachment and blade lead-lag and damper motion, providing a soft in-plane rotor. Pitch hinges 28 provide blade pitch change for the blade 20 without transmitting centrifugal force load. A tension-torsion strap 30 provides tension centrifugal force load path structure without reacting torsion or bending. A bearing/bushing 32 permits blade lag motion. An elastomeric spring damper creates moments about the lag hinge to optimize the natural frequency of the rotor lag mode and provides damping to help stabilize this mode.

With further reference to FIG. 2, a four-bladed rotor hub assembly 10 is mounted rigidly on the upper end of a mast 16 by means of a pair of hub clamp plates 36 and 38. In an alternate embodiment, an integral flange on the mast may also be used instead of the lower hub clamp plate 38. The hub assembly 10 is characterized by a flat carbon-epoxy yoke center section 22, which is secured between the lower face of the upper clamp plate 36 and the upper face of the lower clamp plate 38. The upper hub clamp plate 36 includes a plate with an integral splined sleeve 34 that extends thru the hub assembly 10. The lower hub plate 38 is a simple flat ring that attaches to the upper plate 36 to complete the hub assembly 10. Four identical carbon-epoxy arms 18 are integral to the center section 22 of the yoke 14 and extend outward from the center section 22. The yoke 14 may be molded with the yoke arms 18 coned relative to the hub center section 22 to reduce the steady stresses. If employed, this feature is described as "pre-cone".

Figure 4:
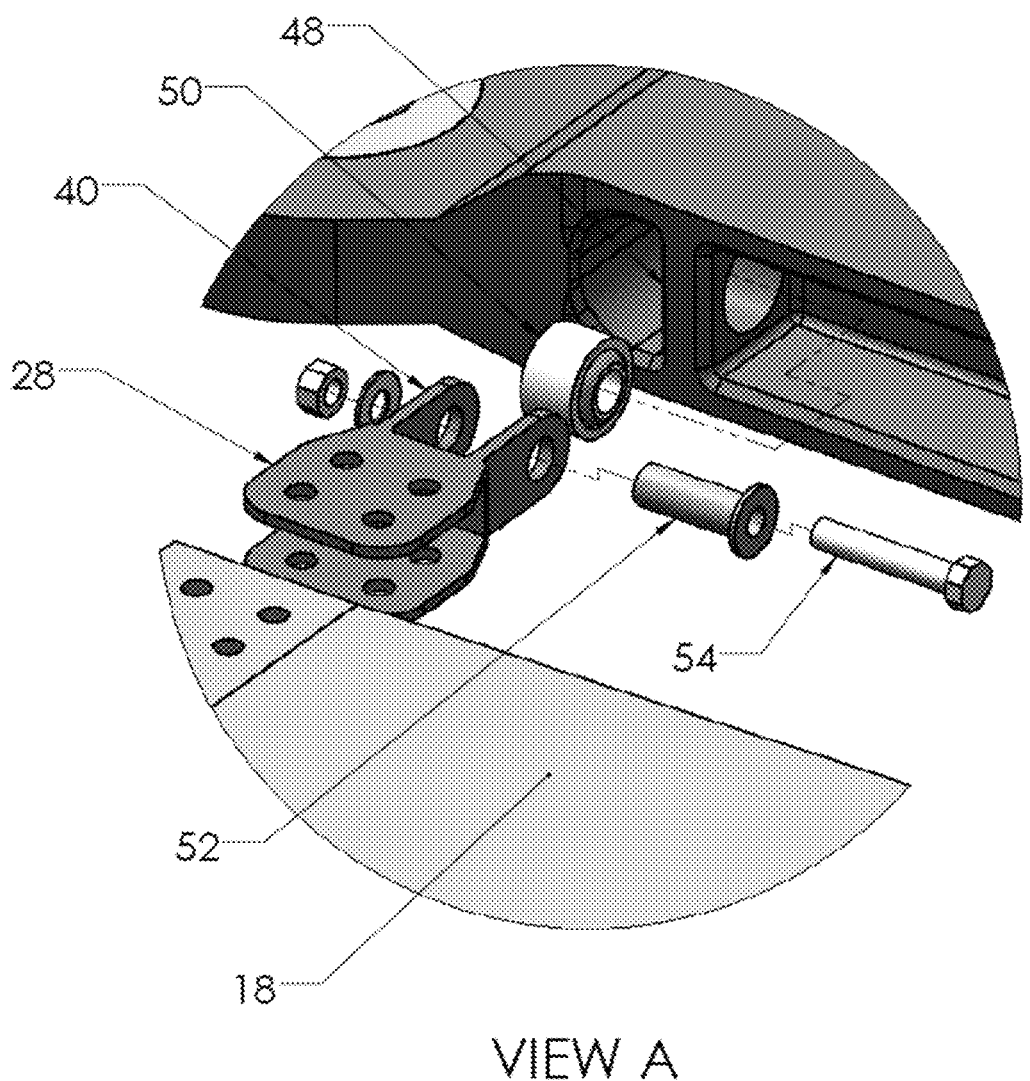
FIG. 4 depicts the assembly of the joint accommodating blade pitch change and the transfer of shears between the grip and the yoke.

FIG. 3 depicts an exploded view of the carbon-epoxy yoke arm 18. Each yoke arm 18 has two hinge fittings 28 fastened to the trailing edge. Each hinge fitting 28 has two vertical tabs 40. A tension-torsion strap 30 attaches to a steel fitting 42 to transfer centrifugal forces to the hub plates 36 and 38 and into the mast 16. The steel fitting 42 attaches to the hub plates 36 and 38 in a manner that prevents the centrifugal forces from being reacted by the carbon epoxy yoke center section 22. The strap 30 is soft torsionally to accommodate pitch change motion from the rotor controls. A blade grip 12 attaches to the outboard end of the tension-torsion strap 30 with a bolt 44. A pitch horn 46 attaches to the inboard end of the grip 12, or alternately, is an integral part of the grip 12. Integral internal webs 48, shown in FIG. 4, are included in each end of the grip 12. In another embodiment of this design, the tension-torsion strap 30 may be eliminated by extending the length of the grip 12 and attaching the root end of the grip 12 to a bearing attached to link 42.

Embodiments of the grip 12 attach to the yoke 14 as depicted in View A of FIG. 3, which is shown in greater detail in FIG. 4. A stainless-steel race and lined spherical bearings 50 are press fit inside the inboard and outboard internal webs 48 of the grip 12. The inside of the spherical bearing 50 is lined for easy movement of the mono-ball inside the race to prevent the assembly from reacting a moment in any direction. The mono-ball spherical is lined on the inside IML to provide a low friction surface for the bearing to slide on the sleeved shoulder bushing 52. This assembly, secured with bolt 54, provides for rotation of the bearing to accommodate blade pitch change while providing a load path for blade vertical and inplane shears to be transmitted to the grip 12. The grip 12 is then attached to the vertical arms 40 of the hinge fittings 28 with a sleeved shoulder bushing 52. The length of the shoulder bushing 52 is carefully controlled so that the vertical arms 40 on the hinge fittings 28 are not subjected to bending stresses and to accommodate small axial motions to prevent centrifugal forces from being transmitted to the yoke 14. The Section A-A view of FIG. 5 also illustrates these details. The hinge fittings 28 are attached to the yoke arm 18 to complete the hub assembly 10.

The outboard end of the grip 12, shown in FIG. 6, has two in-line holes 56 and 58 and provisions for securing the blade 20, attaching a lag spring and damper, and accommodating blade fold. The larger hole on the inboard side of the grip accommodates an elastomeric grip bearing 60. The blade 20 has a mating hole on the root end and a bolt 62 attaches the blade 20 to the grip 12. The grip bearing 60 is the primary load path for transferring centrifugal forces from the blade 20 to the grip 12. The grip bearing 60 also acts as a lag hinge, providing flexibility for the blade lead and lag motion and tuning the first blade mode natural frequency below 1/rev which is characteristic of the descriptor "soft-in-plane".

The smaller hole 58 on the outboard end of the grip 12 is oversized to permit the blade lead-lag motion and to act as a stop when contacted by the bolt 64 which attaches the damper 66 to the blade 20 and passes thru the grip 12. The damper 66 also contains an elastomer that provides both a damping and spring force around the lag bushing. The damping force contributes to the damping required to lag mode Shims 68 are disposed between the elastomer and blade 20, The outboard bolt 64 is also designed as an alternate load path for centrifugal force in the event the inboard bolt fails. Manual blade fold, illustrated in FIG. 2, is accommodated by disconnecting bolt 64 and rotating the blade 20 about the inboard bushing 60.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A soft-inplane flexbeam rotor hub section for a helicopter mast, comprising:
 upper and lower hub plates operatively coupling the soft-inplane flexbeam rotor hub section with the mast in a manner that transmits rotor hub section forces and moments from the soft-inplane flexbeam rotor hub section to the mast;

a yoke, having a plurality of yoke arms that extend radially along radial axes from a yoke center, which is disposed between the upper and lower hub plates, operatively coupled with the mast;

a plurality of blade grips, having axes extending between opposite first and second end portions, operatively coupled with the plurality of yoke arms at each of the opposite first and second end portions of the plurality of blade grips;

the radial axes of the yoke arms being disposed co-planar with the axes of the plurality of blade grips such that the yoke arms are positioned in-line with a blade radial axis to minimize drag.

2. The rotor hub section of claim 1 wherein the plurality of yoke arms are equally spaced from one another and are comprised of a carbon-epoxy structure with a flapwise stiffness that permits the yoke to deform in a manner that creates an equivalent hinge about which the yoke may deflect normal to the plane of the rotor hub section.

3. The rotor hub section of claim 1 wherein the unitary yoke is comprised of carbon epoxy and exhibits a stiffness when deflected normal to the plane of the rotor hub section defining a preselected moment at the helicopter mast.

4. A soft-inplane flexbeam rotor hub section for a helicopter mast, comprising:

a plurality of blade grips operatively coupled with a plurality of yoke arms of a hub section yoke; radial axes of the yoke arms being disposed co-planar with long axes of the plurality of blade grips;

the plurality of blade grips each including a grip bearing and damper, disposed in a spaced apart relationship with one another along a blade grip axis, the grip bearing and damper configured to transmit blade centrifugal forces from a blade to the blade grip.

5. The rotor hub section of claim 4 wherein each of the plurality of blade grips include an integral pitch horn that transmits pitch change motion from helicopter controls to the blade grip; an axis of the pitch horn being co-planar with the axes of the plurality of blade grips.

6. The rotor hub section of claim 4 wherein each of the plurality of blade grips comprises a pitch horn wherein each of the plurality of blade grips transmit displacements from helicopter controls to displace the pitch horn associated with each of the plurality of blade grips and create angular motion to change a blade pitch angle.

7. The rotor hub section of claim 4 wherein each of the plurality of blade grips comprises a pitch horn and wherein the plurality of blade grips transmit displacements from helicopter controls to displace the pitch horn associated with each of the plurality of blade grips and create angular motion by rotating the plurality of blade grips relative to the yoke, pivoting on lined spherical bearings.

8. The rotor hub of claim 4 wherein the plurality of blade grips transmit rotor induced vertical and in-plane shears from the plurality of blade grips to the yoke through lined spherical bearings.

9. A soft-inplane flexbeam rotor hub section for a helicopter mast, comprising:

an elastomeric bearing disposed adjacent an outboard end of each of a plurality of grips and including provisions to mount a blade to each of the plurality of grips wherein each blade comprises a plurality of tangs disposed on opposite ends of the elastomeric bearing; the elastomeric bearing being configured to transfer centrifugal forces from the blade to plurality of grips.

10. The rotor hub of claim 9 comprising a blade attachment bolt assembly wherein the elastomeric bearing and blade attachment bolt assembly are configured to accommodate up to 90 degrees of rotation for manual blade folding.

11. The rotor hub of claim 9 wherein an elastomeric damper is comprised of one or more planar elastomer members sandwiched between spaced apart plates associated with the plurality of grips that attach to a yoke and the blade; the planar elastomeric members being co-planar with the plurality of blade grips to provide a low-profile damper assembly.

12. The rotor hub of claim 9 wherein the elastomeric bearing at the outboard end of the grip is comprised of a resilient material that permits lead lag motion between a blade grip and the blade; the elastomeric bearing is disposed co-planar with the plurality of blade grips to provide a low-profile lead/lag bearing assembly.

13. The rotor hub of claim 9 comprising a damper assembly wherein the elastomeric bearing and damper assembly at the outboard end of the grip is configured to serve as a spring to tune a first inplane mode frequency below 1/rev and a damper to increase a stability of the first inplane mode.

14. The rotor hub of claim 9 wherein the elastomeric bearing and damper assembly at the outboard end of the grip includes an integral stop to limit inplane motion and provide an alternate load path if a main bearing near the outboard end of the yoke should be damaged or fail.

15. The rotor hub of claim 4 wherein the damper is comprised of a planar elastomer member that is co-planar with the plurality of blade grips to provide a low-profile damper assembly.

* * * * *